(12) United States Patent
Kim

(10) Patent No.: US 6,717,638 B1
(45) Date of Patent: Apr. 6, 2004

(54) LIQUID CRYSTAL DISPLAY DEVICE AND METHOD OF MANUFACTURING THE SAME

(75) Inventor: Woong-Kwon Kim, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/712,190

(22) Filed: Nov. 15, 2000

(30) Foreign Application Priority Data

Nov. 15, 1999 (KR) .......................... 1999-50512

(51) Int. Cl.⁷ .................. G02F 1/136; G02F 1/1335
(52) U.S. Cl. .................. 349/106; 349/43; 349/79
(58) Field of Search .................. 349/43, 106, 79

(56) References Cited

U.S. PATENT DOCUMENTS

| | | | | |
|---|---|---|---|---|
| 5,724,107 A | * | 3/1998 | Nishikawa et al. | 349/38 |
| 5,994,721 A | * | 11/1999 | Zhong et al. | 257/89 |
| 6,104,459 A | * | 8/2000 | Oike et al. | 349/105 |
| 6,111,623 A | * | 8/2000 | Sato | 349/106 |
| 6,162,510 A | * | 12/2000 | Kashiwazaki et al. | 427/511 |
| 6,166,786 A | * | 12/2000 | Ohkubo et al. | 349/43 |
| 6,211,928 B1 | * | 4/2001 | Oh et al. | 349/43 |
| 6,221,543 B1 | * | 4/2001 | Guehler et al. | 430/7 |
| 6,281,955 B1 | * | 8/2001 | Midorikawa et al. | 349/106 |
| 6,297,862 B1 | * | 10/2001 | Murade | 349/44 |
| 6,327,006 B1 | * | 12/2001 | Sato et al. | 349/44 |

OTHER PUBLICATIONS

Pichon et al.; "Low temperature unhydrogennated in–situ doped polysilicon thin film transistors: Toward a technology for flat panel displays"; Thin Solid Film, vol. 296, pp. 133–136 (1997).*

* cited by examiner

Primary Examiner—T. Chowdhury
Assistant Examiner—Hoan Chau Nguyen
(74) Attorney, Agent, or Firm—Birch, Stewart, Kolasch & Birch, LLP (57) ABSTRACT

A liquid crystal display (LCD) device having a color filter on a thin film transistor (TFT) structure (COT structure). The color filter layers are formed on the same substrate as the TFT to be in direct contact with the source and drain electrodes without any intermediaries therebetween. In particular, there is no need for a passivation layer between the TFT and the color filter layers. Preferred embodiments include a back etched type TFT that does not require a light shielding layer, an etch-stopped type TFT having an etch stop layer, and a coplanar type TFT having a light shielding layer below the gate electrode of the TFT.

23 Claims, 7 Drawing Sheets

LIQUID CRYSTAL DISPLAY DEVICE AND METHOD OF MANUFACTURING THE SAME

CROSS REFERENCE

This application claims the benefit of Korean Patent Application No. 1999-50512, filed on Nov. 15, 1999, under 35 U.S.C. § 119, the entirety of which is hereby incorporated by reference.

BACKGROUND OF THE INVENTION

1. Field of the invention

The present invention relates to a liquid crystal display device, and more particularly, to a liquid crystal display (LCD) device and a method of manufacturing the same.

2. Description of Related Art

Of the liquid crystal display devices, an active matrix liquid crystal display (AM-LCD) device, in which the thin film transistors and the pixel electrodes are arranged in the form of a matrix, has lately received special attention due to its high resolution and high performance in displaying moving images.

Figure 1:
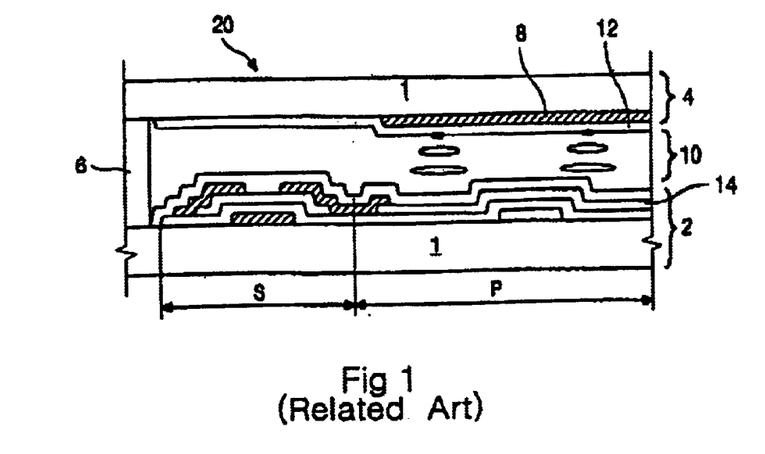
FIG. 1 is a cross sectional view illustrating a typical LCD device.

FIG. 1 is a cross sectional view illustrating a typical LCD device. As shown in FIG. 1, the LCD device includes lower and upper substrates 2 and 4 with a liquid crystal layer 10 interposed therebetween. The lower substrate 2 has a thin film transistor "S" (TFT) as a switching element and a pixel electrode 14, while the upper substrate 4 has a color filter 8 and a common electrode 12. The pixel electrode 14 is formed over a pixel region "P" and serves to apply a voltage to the liquid crystal layer 10 along with the common electrode 12, and the color filter 8 serves to implement natural colors. A sealant 6 seals an edge of the lower and upper substrate 2 and 4 to prevent leakage of the liquid crystal layer 10.

In order to manufacture the LCD device described above, the upper and lower substrates 4 and 2 are manufactured by a different process, respectively, and are aligned and assembled to each other. However, such a manufacturing process is very complex.

In order to simplify such a manufacturing process, a structure having a color filter formed on the TFT array substrate, hereinafter referred to as simply "a color filter on TFT (COT) structure" has been introduced.

Figure 2A:
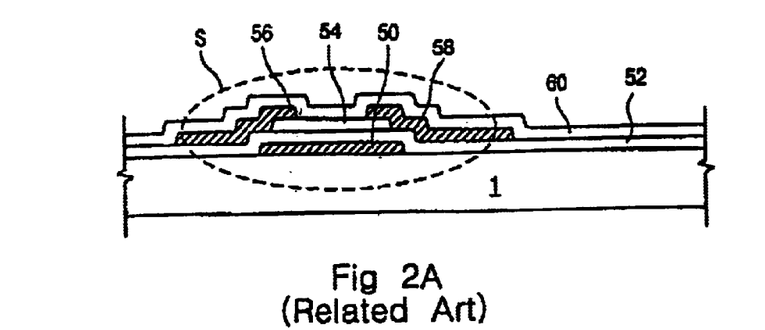
FIGS. 2A to 2D are cross sectional views illustrating a process of manufacturing a conventional LCD device having a COT structure.

FIGS. 2A to 2D are cross sectional views illustrating a process of manufacturing a conventional LCD device having the COT structure. First, as shown in FIG. 2A, a gate electrode 50 is formed on the substrate 1. A gate insulating layer 52 is formed over the whole substrate 1 while covering the gate electrode 50. A semiconductor layer 54 is formed on the gate insulating layer 52. The source and drain electrodes 56 and 58 are spaced apart from each other and overlap both end portions of the semiconductor layer 54, respectively. A passivation film 60 is formed over the whole substrate 1 while covering the source and drain electrodes 56 and 58 and the semiconductor layer 54. The semiconductor layer 54 includes an amorphous silicon layer and 7a doped semiconductor layer. A portion of the doped semiconductor layer between the source and drain electrodes is etched to form a channel region.

Figure 2B:
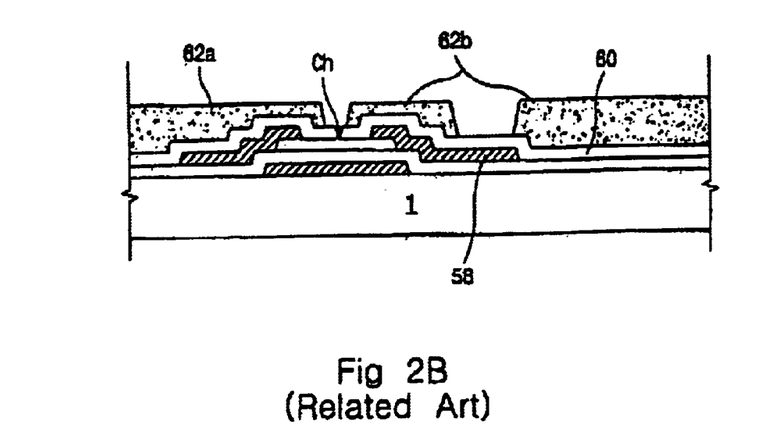

Then, the color filter including the color filter layers 62a and 62b of red (R), green (G) and blue (B) are formed over the whole substrate 1. In order to form the three color filter layers of R, G and B, the steps of depositing and patterning a color resin are repeated three times. At this point, a portion of the color filter layer 62a on the channel region "ch" and a portion of the color filter layer 62b over the drain electrode 58 are etched to be exposed. The reason is to form a light shielding layer and a drain contact hole in a subsequent process.

Figure 2C:
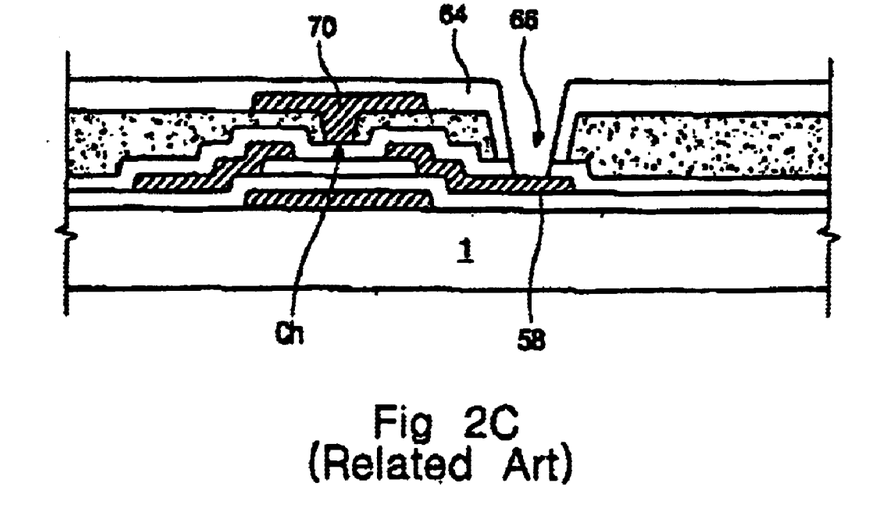

Subsequently, as shown in FIG. 2C, a light shielding layer 70 is formed to cover the channel region "ch", and a planarization layer 64 is formed over the whole substrate 1 while covering the light shielding layer 70. The light shielding layer 70 serves to shield the channel region "ch" from light and thus is made of an opaque material. Then, portions of the passivation film 60 and the planarization layer 64 are etched to form the drain electrode contact hole 66 on a portion of the drain electrode 58.

Figure 2D:
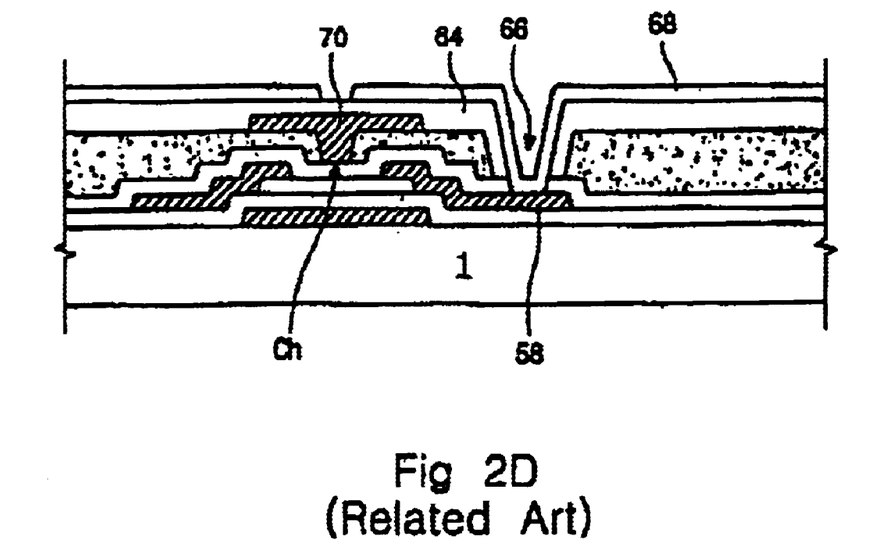

Finally, as shown in FIG. 2D, a pixel electrode 68 is formed on the planarization layer 64. The pixel electrode 68 is electrically connected with the drain electrode 58 through the drain electrode contact hole 66.

The method of manufacturing the lower array substrate using the COT technique described above has a high manufacturing yield compared to the method wherein the TFT and the color filter are respectively formed on the different substrates because the pixel electrode and the color filter are easily aligned.

A large-sized LCD device having a high resolution has been recently in great demand. The manufacturing process of a large-sized LCD device has become very complicated, leading to many problems. For example, referring to FIG. 1, in a large-sized LCD device, the upper substrate 4 including the color filter 8 and the lower substrate 2 including the TFTs are manufactured by a different manufacturing process, so that a coefficient of thermal expansion of the two substrates 2 and 4 become different. Thus, an alignment margin between the two substrates 4 and 2 should be considered. In other words, an alignment margin between the lower and upper substrates 2 and 4 is formed due to a difference of the processing temperatures between the two substrates 2 and 4. The processing temperature of the upper substrate 4 is about 220° C., while that of the lower substrate 2 is about 300° C. The alignment margin is one cause that adversely affects an aperture ratio, as the alignment margins need to be covered by a black matrix for shielding light provided by a light source. As the size of the substrate increases, the aperture ratio also increases. As a result, the required increase in the alignment margins affects the aperture ratio.

When an LCD device is manufactured using the COT technique, there is a disadvantage that the process of forming the passivation film 60 is additionally required. For the foregoing reasons, there is a need for an LCD device having a simplified manufacturing process, a high manufacturing yield, and a high aperture ratio.

SUMMARY OF THE INVENTION

To overcome the problems described above, preferred embodiments of the present invention provide a liquid crystal display device having a simplified manufacturing process, a high manufacturing yield, and a high aperture ratio.

A first preferred embodiment of the present invention provides a liquid crystal display device, including: a thin film transistor formed on a substrate, including a gate electrode, a source electrode, and a drain electrode; a color filter overlapping at least one of the source and drain electrodes; a planarization layer formed on the thin film transistor and the color filter; and a pixel electrode formed on the planarization layer and contacting the drain electrode.

The thin film transistor further includes: a gate insulating layer on the substrate and covering the gate electrode; and a semiconductor layer formed on the gate insulating layer, having an amorphous silicon layer and a doped amorphous silicon layer, wherein the gate electrode is formed on the substrate and the source and drian electrode are spaced apart form each other and overlap both end portions of the doped amorphous silicon layer, respectively.

In a second preferred embodiment, the thin film transistor may include an etch stopper on the doped amorphous silicon layer and between the source and drain electrodes.

In a third preferred embodiment, the thin film transistor further includes: an active layer having source and drain regions at both end portions thereof; a gate insulating layer on a central portion of the active layer other than the source and drain regions; a gate electrode formed on the gate insulating layer; and an inter layer insulator formed over the substrate, having first and second contact holes for respectively exposing a portion of the source and drain regions, wherein the source and drain electrodes are formed on the inter layer insulator to respectively contact with the source and drain regions. The active layer can be made of polysilicon. The liquid crystal display device may include a light shielding layer formed between the substrate and the thin film transistor and an insulating layer covering the light shielding layer.

The first preferred embodiment of the present invention provides a method of manufacturing a liquid crystal display device, including: providing a substrate; forming a gate electrode on the substrate; depositing sequentially a gate insulating layer, a pure semiconductor layer and a doped semiconductor layer over the whole substrate; etching the pure semiconductor layer and the doped semiconductor layer to form an active layer, forming source and drain electrodes on the active layer; forming a color filter, the color filter overlapping a portion of the source and drain electrodes; etching a portion of the doped semiconductor layer between the source and drain electrodes to form a channel region; forming a planarization layer over the substrate, the planarization layer including a drain contact hole on a portion of the drain electrode; and forming a pixel electrode on the planarization layer, the pixel electrode electrically contact the drain electrode through the drain contact hole.

The second preferred embodiment of the present invention provides a method of manufacturing a liquid crystal display device, including: providing a substrate, the substrate including first and second regions; forming a thin film transistor on the first region of the substrate, the thin film transistor including a gate electrode, an active layer, and source and drain electrodes; forming a color filter on a second region of the substrate, the color filter overlapping the source and drain electrodes; forming a planarization layer on the thin film transistor and the color filter, the planarization layer including a drain contact hole on a portion of the drain electrode; and forming a pixel electrode on the planarization layer, the pixel electrode electrically contacting with the drain electrode through the drain contact hole. Forming the thin film transistor includes: forming a gate electrode; forming a gate insulating layer, the gate insulating layer covering the gate electrode; depositing a pure semiconductor layer on the gate insulating layer and patterning it to form an active layer; forming an etch stopper on the active layer; depositing a doped semiconductor layer, the doped semiconductor layer covering the pure semiconductor layer and the etch stopper layer; forming source and drain electrodes on the doped semiconductor layer, and etching a portion of the doped semiconductor layer between the source and drain electrodes.

In a third preferred embodiment, the method further includes forming a light shielding layer before forming the thin film transistor; and forming an insulating layer for covering the light shielding layer. The active layer can be made of amorphous silicon. Forming the thin film transistor includes: forming a pure semiconductor layer; forming a gate insulating layer, a width of the gate insulating layer being smaller than the pure semiconductor layer; forming a gate electrode on the gate insulating layer; ion-doping an exposed portion of the pure semiconductor layer to define source and drain regions; forming an interlayer insulator over the substrate, the interlayer including a source region contact hole on a portion of the source electrode and a drain region contact hole on a portion of the drain electrode; and forming source and drain electrodes, the source and drain electrodes electrically contacting with the source and drain regions, respectively. The pure semiconductor layer can be made of polysilicon.

The LCD device having the COT structure according the preferred embodiments of the present invention has the following advantages. Firstly, since the color filter and the TFT are formed on the same substrate, a high aperture ratio can be obtained. Secondly, since an alignment margin between the lower and upper substrates is not required as in the conventional art due to the difference of the processing temperatures between the two substrates, the manufacturing yield is improved. Thirdly, since an additional passivation film is not required, the manufacturing process is simplified.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to preferred embodiments of the present invention, example of which is illustrated in the accompanying drawings. A detailed description of various features in a LCD device with TFTs is being omitted for the sake of simplicity so that the features of the present invention are not obscured. One skilled in the art would understand that elements such as polarization plates, a liquid crystal layer, etc. are also part of the invention.

Figure 5A:
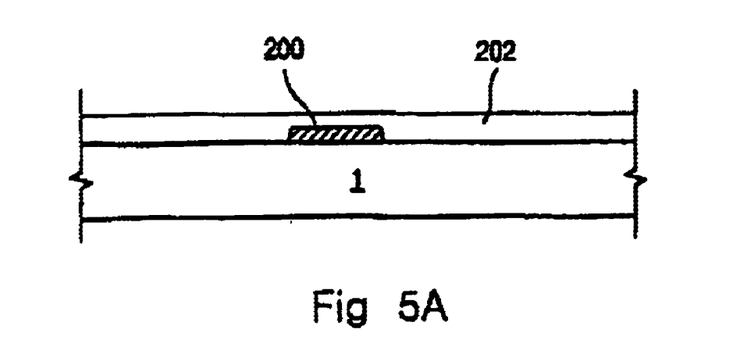
FIGS. 5A to 5E are cross sectional views illustrating a process of manufacturing the LCD device according to a third preferred embodiment of the present invention.
Figure 5B:
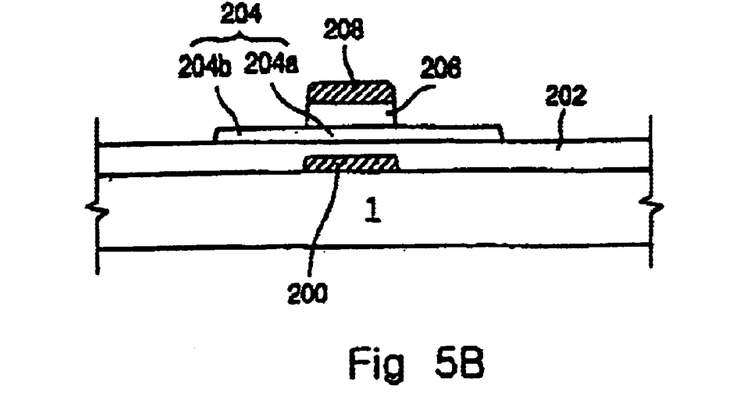
Figure 5C:
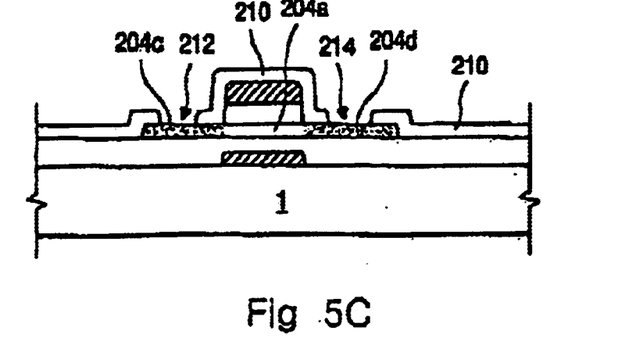
Figure 5D:
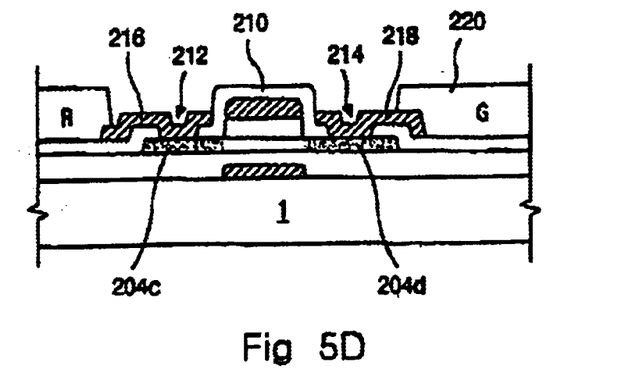
Figure 5E:
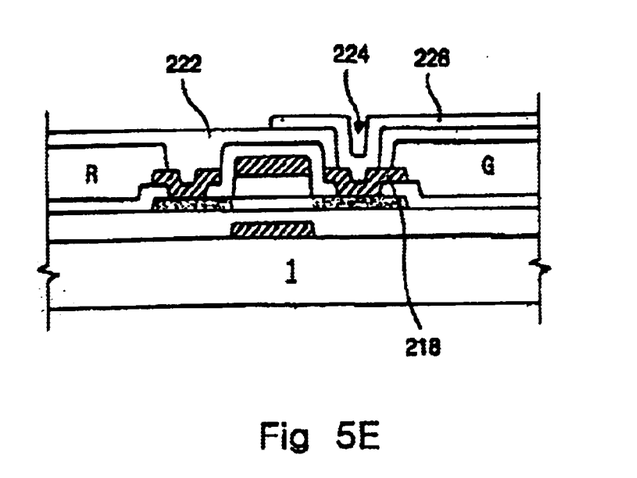
Figure 6:
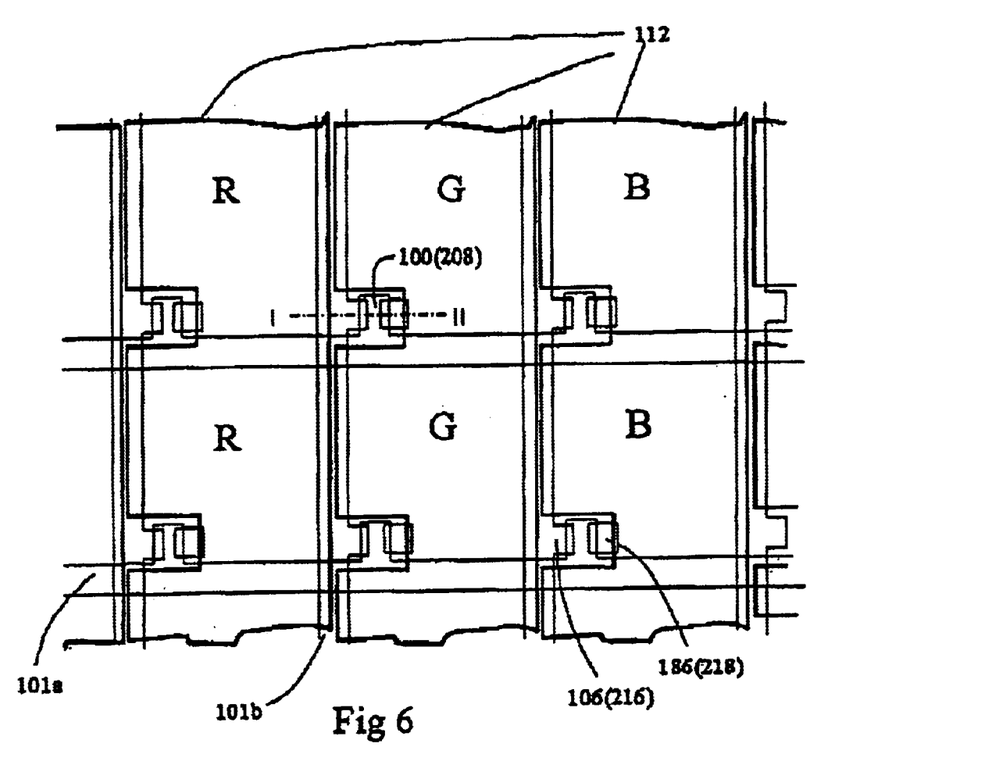
FIG. 6 is a plan view illustrating an array substrate for use in a liquid crystal display according to the present invention.

FIG. 6 is a plan view illustrating an array substrate for use in a liquid crystal display according to the present invention. The array substrate has gate lines 101a in a transverse direction, data lines 101b arranged in a longitudinal direction perpendicular to the gate lines 101a. Patterns of the semiconductor layer and pixel electrode are not shown for simplicity. FIGS. 3A to 5E are cross sectional views taken along line I–II of FIG. 6, illustrating fabrication process steps of an array substrate having color filters according to the present invention.

In general, a thin film transistor (TFT) is divided into a staggered type and a coplanar type. The staggered type TFT includes an inverted staggered type. The inverted staggered type TFT includes a back channel etched type and an etch stopper type.

Figure 3A:
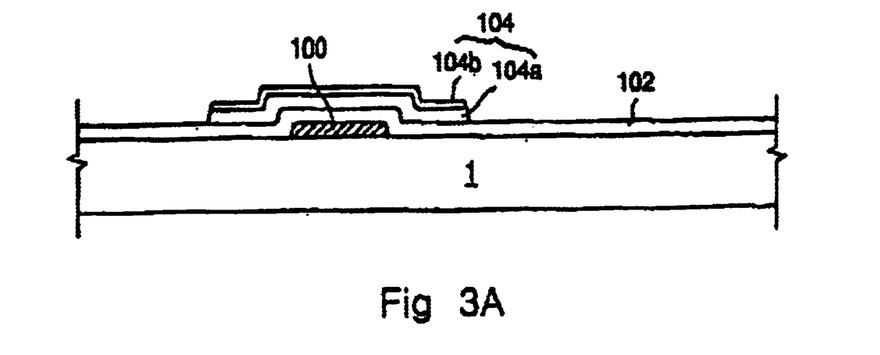
FIGS. 3A to 3E are cross sectional views illustrating a process of manufacturing a liquid crystal display device having a COT structure according to a first preferred embodiment of the present invention.

A first preferred embodiment of the present invention relates to an LCD having a COT structure and using a back channel etched type TFT as a switching element. FIGS. 3A to 3E are cross sectional views illustrating a process of manufacturing the LCD according to the first preferred embodiment of the present invention. First, as shown in FIG. 3A, a gate electrode 100 is formed on a substrate 1. Thereafter, a gate insulating layer 102 and a semiconductor layer 104 are sequentially formed. The semiconductor layer 104 has a dual-layered structure of an amorphous silicon layer 104a and a doped amorphous silicon layer 104b. The doped amorphous silicon layer 104b can be formed by implanting a gas containing phosphorous (P), e.g., as part of a nitrogen group.

Figure 3B:
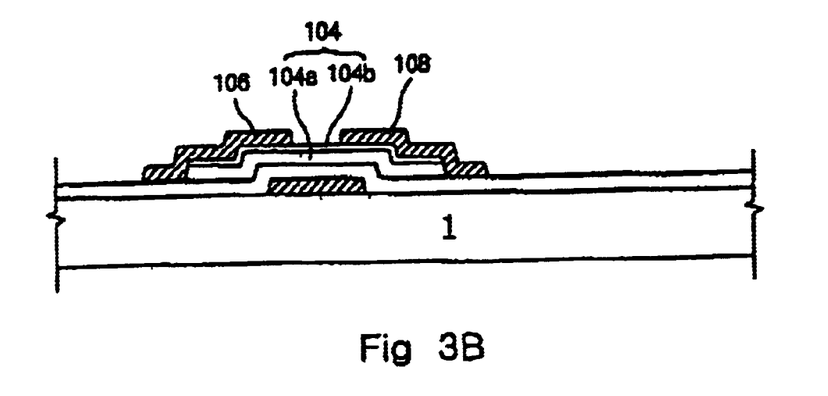

Subsequently, as shown in FIG. 3B and FIG. 6, source and drain electrodes 106 and 108 and data line 101b are formed over the semiconductor layer 104. The source and drain electrodes 106 and 108 are spaced apart from each other and overlap both end portions of the doped, amorphous silicon layer 104b, respectively. In the conventional art, a portion of the doped amorphous silicon layer 104b between the source and drain electrodes 106 and 108 is etched directly after forming the source and drain electrodes 106 and 108. But, according to the present invention, a step of forming a channel region is not performed in this step in order to protect the channel portion 110 during forming of the color filter. In other words, the doped amorphous silicon layer 104b serves as a passivation film.

Figure 3C:
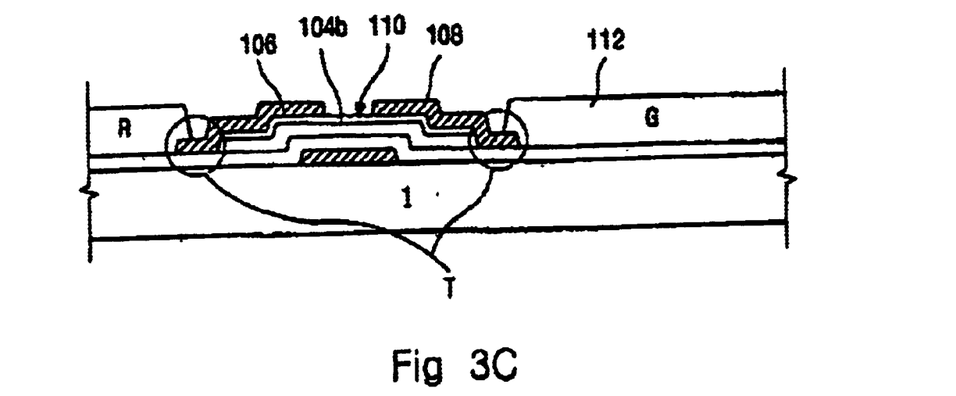

Then, as shown in FIG. 3C and FIG. 6, a color filter 112 including color filter layers R(red), G(green) and B(blue) is formed in a stripe shape. In order to form the color filter 112 including the color filter layers of R, G and B, a process of depositing a color resin and pattering it is repeated three times. At this point, the color filter 112 for each TFT overlaps an side portion of the data line 101b and an end portion of the drain electrode 108, denoted as the regions "T" in FIG. 3C, so as to prevent light leakage and to improve an aperture ratio. Because boundary of adjacent color filter stripes is located on the center portion of the data line, it can provide a sharp, immutable boundary between color filter stripe. Bleeding of adjoining color filters to each other and blurring of boundaries can be also avoided. The color filter can overlap a portion of source electrode 106. Thereafter, using the source and drain electrodes 106 and 108 as a mask, a portion of the doped amorphous silicon layer 104b between the source and drain electrodes 106 and 108 is etched by a dry or a wet-etching technique to form a channel region.

Figure 3D:
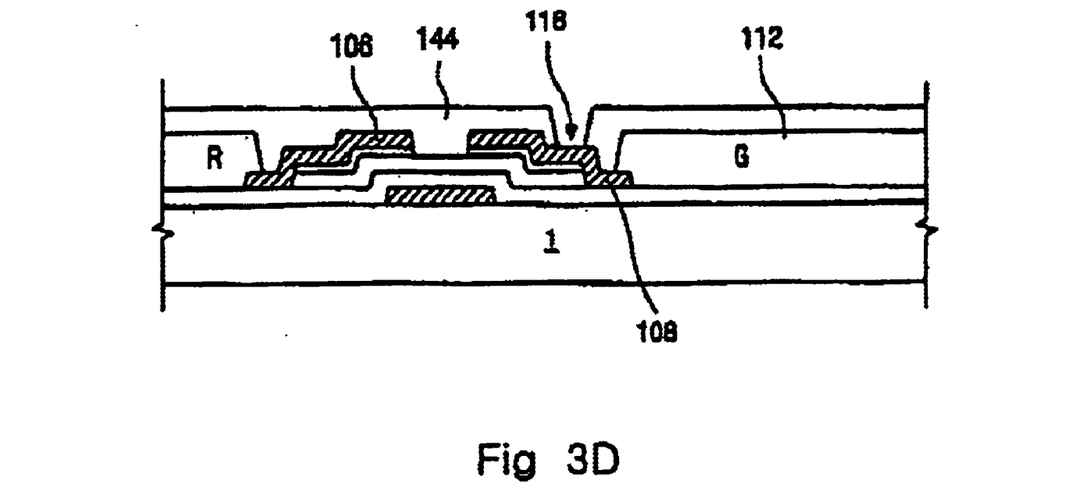

As shown in FIG. 3D, a planarization layer 144 is formed over the whole substrate 1. The planarization layer 144 includes a drain contact hole 116 above a portion of the drain electrode 108. The planarization layer 144 is made of an inorganic material such as SiOx and SiNx or an organic material such as benzocyclobutene (BCB).

Figure 3E:
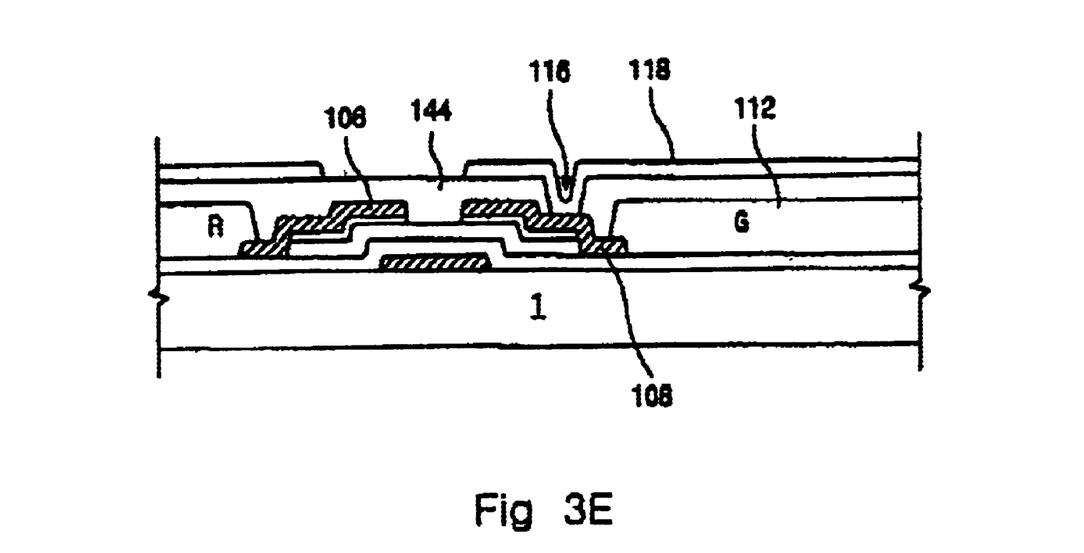

Finally, as shown in FIG. 3E, a pixel electrode 118 is formed on the planarization layer 144. The pixel electrode 118 electrically contacts the drain electrode 118 through the drain contact hole 116.

A second preferred embodiment of the present invention relates to an LCD device having the COT structure and using an etch-stopper type TFT as a switching element. The etch stopper type TFT has a more complex manufacturing process than the back channel etched type TFT but has an advantage in that the amorphous silicon layer is thinly formed.

Figure 4:
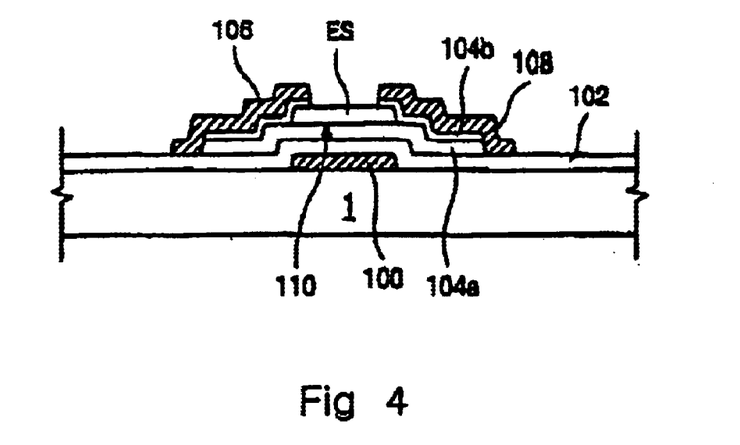
FIG. 4 is a cross sectional view illustrating a structure during the manufacturing of the LCD device according to a second preferred embodiment of the present invention.

FIG. 4 is a cross sectional view illustrating a structure during the manufacturing of an etch stopper type TFT according to the second preferred embodiment of the present invention. As shown in FIG. 4, a gate electrode 100 is formed on a substrate 1. A gate insulating layer 102 is formed over the whole substrate I while covering the gate electrode 100. An amorphous silicon layer 104a is formed on the gate insulating layer 102. An etch stopper ES is formed on the amorphous silicon layer 104a A doped amorphous silicon layer 104b covers the amorphous silicon layer 104a and the etch stopper ES. Source and drain electrodes 106 and 108 are spaced apart from each other and overlaps both end portions of the doped amorphous silicon layer 104b. A portion of the doped amorphous silicon layer 104b between the source and drain electrodes 106 and 108 is etched. At this point, the etch stopper ES serves to prevent the amorphous silicon layer 104a from being etched.

Using the etch stopper ES is advantageous over the first embodiment. Referring to FIG. 3C showing the first embodiment, the portion of the doped amorphous silicon layer 104b between the source and drain electrodes 106 and 108 is etched to form the channel region. However, in doing so, the amorphous silicon layer 104a may be etched as well. Therefore, it is preferable that the amorphous silicon layer 104a has a sufficient thickness to compensate for any, i.e., etching of it, that might occur when forming the channel region according to the first embodiment.

However, in the second preferred embodiment of the present invention, the amorphous silicon layer 104a can be made thin because the etch stopper ES prevents any over-etching of the amorphous silicon layer 104a during the formation of the channel region.

The subsequent processes used to achieve the structure shown in FIG. 4 are the same as those in FIGS. 3D and 3E, and thus a detailed description thereof has been omitted.

A third preferred embodiment of the present invention relates to an LCD device having the COT structure and using a coplanar type TFT as a switching element. FIGS. 5A to 5E are cross sectional views illustrating a process of manufacturing the LCD device according to the third preferred embodiment of the present invention. First, as shown in FIG. 5A, a light shielding layer 200 is formed on a substrate 1. The light shielding layer 200 serves to protect an active layer 204 from light. A first insulating layer 202 is formed on the substrate 1 while covering the light shielding layer 200.

Then, as shown in FIG. 5B, an active layer 204 is formed on the first insulating layer 202. A second insulating layer 206 and a gate electrode 208 are sequentially formed on the active layer 204. The second insulating layer 206 and the gate electrode 208 are smaller in width than the active layer 204. The active layer 204 includes first and second active layer portions 204a and 204b. The first active layer portion 204a is a portion under the gate electrode 208, and the second active layer portion 204b is an exposed portion that is not covered by the gate electrode 208. After forming the gate electrode 208, the second active layer portion 204b is ion-doped by a gas containing either boron or other element from a boron group of the periodic table or a phosphorous or other element from a nitrogen group of the periodic table in, for example $B_2H_6$ or $PH_3$. When a gas containing a boron ion is implanted, the second active layer portion 204b becomes a p-type semiconductor. When a gas containing a phosphorous ion is implanted, the second active layer portion 204b becomes an n-type semiconductor. As a result, source and drain regions 204c and 204d are formed.

Subsequently, as shown in FIG. 5C, a third insulating layer 210 is formed over the whole substrate 1. The third insulating layer 210 serves as an interlayer insulator. The third insulating layer 210 includes source and drain contact holes 212 and 214 to respectively expose the source and drain regions 204c and 204d.

Next, as shown in FIG. 5D, source and drain electrodes 216 and 218 are formed on the third insulating layer 210 and are electrically connected with the source and drain regions 204c and 204d through the source and drain contact holes 212 and 214, respectively. Thereafter, a color filter 220 (including the color filter layers R, G and B) is formed to respectively overlap side portions of the data line 101b and drain electrode 218. In other words, the color filter layers R overlap side portions of the data line 101b, and the color filter layers G overlap end portions of the drain electrode 218 as shown in FIG. 6. The color filter can be overlap a portion of source electrode 216. The reason for this overlap is to prevent light leakage, to improve an aperture ratio and to have a sharp boundary between adjoining two color filter stripes.

Finally, as shown in FIG. 5E, a planarization layer 222 is formed over the whole substrate 1. The planarization layer 222 includes a contact hole 224 for exposing a portion of the drain electrode 218. Thereafter, a pixel electrode 226 is formed on the planarization layer 222 to electrically contact the drain electrode 218 through the contact hole 224. The pixel electrode 226 is made of indium tin oxide (ITO).

The coplanar type TFT according to the third preferred embodiment of the present invention uses the amorphous silicon layer as an active layer. However, a polysilicon layer can be used as an active layer. At this point, in the event that an active layer is made of polysilicon, the step of forming the light shielding layer 200, which is shown in FIG. 5A, is not required.

As described herein before, the LCD device having the COT structure according the preferred embodiments of the present invention has the following advantages. Firstly, since the color filter and the TFT are formed on the same substrate, a high aperture ratio can be obtained. Secondly, since an alignment margin between the lower and upper substrates is not required as in the conventional art (due to the difference of the processing temperatures between the two substrates), the manufacturing yield is improved. Thirdly, since an additional passivation film is not required, the manufacturing process is simplified.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display (LCD) device comprising:
   a substrate;
   a gate electrode over the substrate;
   a semiconductor layer aligned with the gate electrode;
   an insulation layer between the gate electrode and the semiconductor layer;
   a source electrode and a drain electrode electrically connected with the semiconductor layer;
   a color filter layer, contacting the both the source and drain electrodes, wherein said contacting is only at a portion where said color filter layer is overlapping only edge portions of the source and the drain electrodes;
   a planarization layer over the color filter layer and the source and the drain electrodes, the planarization layer having an opening exposing the drain electrode thereunder; and
   a pixel electrode on the planarization layer and electrically connected with the drain electrode via the opening in the planarization layer.

2. The device of claim 1, wherein the color filter layer overlaps the source and drain electrodes enough to prevent light leakage.

3. The device of claim 1, wherein the color filter layer covers an end portion of at least the source electrode or the drain electrode.

4. The device of claim 1, wherein the semiconductor layer comprises:
   a first layer on the insulation layer;
   an etch stop layer on the first layer; and
   a second layer over the first layer and the etch stop layer.

5. The device of claim 1, further comprising a light shielding layer below the gate electrode.

6. A method of forming liquid crystal display (LCD) device, the method comprising:
   forming a substrate;
   forming a gate electrode over the substrate;
   forming an insulation layer on the gate electrode and the substrate;
   forming a semiconductor layer, aligned relative to the gate electrode, on the insulating layer, the semiconductor layer having a pure semiconductor layer on the insulating layer and a doped semiconductor layer on the pure semiconductor layer;
   forming a source electrode and a drain electrode electrically connected with the semiconductor layer;
   forming a color filter layer, contacting the both source and drain electrodes, wherein said contacting is only at a portion where said color filter layer is overlapping only edge portions of the source and the drain electrodes;
   etching a portion of the doped semiconductor layer after forming the color filter layer;
   forming a planarization layer over the color filter layer and the source and drain electrodes, the planarization layer having an opening exposing the drain electrode thereunder; and
   forming a pixel electrode on the planarization layer and electrically connected with the drain electrode via the opening in the planarization layer.

7. The method of claim 6, wherein the color filter layer is formed to substantially cover the source and drain electrodes to prevent light leakage.

8. The method of claim 6, wherein the color filter layer is formed to cover an end portion of at least the source electrode or the drain electrode.

9. The method of claim 6, wherein forming the semiconductor layer comprises:

forming a first layer on the insulation layer;

forming an etch stop layer on the first layer; and forming a second layer over the first layer and the etch stop layer.

10. The method of claim 6, further comprising a step of forming a light shielding layer below the gate electrode.

11. A liquid crystal display device comprising:

a thin film transistor (TFT) formed on a substrate, including a gate electrode, a source electrode, and a drain electrode;

a color filter layer, contacting both the source and drain electrodes, wherein said contacting is only at a portion where said color filter layer is overlapping only edge portions of the source and drain electrodes;

a planarization layer formed on the TFT and on the color filter; and a pixel electrode formed on the planarization layer and electrically contacting the drain electrode.

12. The liquid crystal display device of claim 11, wherein the TFT further includes:

a gate insulating layer on the substrate and covering the gate electrode; and a semiconductor layer formed on the gate insulating layer, having an amorphous silicon layer and a doped amorphous silicon layer, wherein the gate electrode is formed on the substrate, while the source and drain electrodes are spaced apart from one another and overlap end portions of the doped amorphous silicon layer, respectively.

13. The liquid crystal display device of claim 12, wherein the TFT further includes an etch stopper formed on the silicon layer and between the source and drain electrodes.

14. The liquid crystal display device of claim 11, further comprising:

a light shielding layer formed between the substrate and the TFT; and an insulating layer covering the light shielding layer.

15. The liquid crystal display device of claim 14, wherein the active layer is made of polysilicon.

16. The liquid crystal display device of claim 11, wherein the TFT further includes:

an active layer having source and drain regions at end portions;

a gate insulating layer on a central portion of the active layer, the gate electrode being formed on the gate insulating layer; and an interlayer insulator formed entirely over the substrate, having a first and a second contact hole which respectively expose a portion of the source and drain regions therebelow, wherein the source and drain electrodes are formed on the interlayer insulator to respectively contact the source and drain regions.

17. A method of manufacturing a liquid crystal display device, the method comprising:

providing a substrate;

forming a gate electrode on the substrate;

depositing sequentially a gate insulating layer, a pure semiconductor layer and a doped semiconductor layer over the substrate;

etching the pure semiconductor layer and the doped semiconductor layer to form an active layer;

forming a source electrode and a drain electrode on the active layer;

forming a color filter, the color filter, contacting the both the source and drain electrodes, said contacting being only at a portion where said color filter layer is overlapping only an edge portion of the source and drain electrodes;

etching a portion of the doped semiconductor layer between the source and drain electrodes to form a channel region of a resulting intermediate structure;

forming a planarization layer over the intermediate structure, the planarization layer including a drain contact hole to expose a portion of the drain electrode; and forming a pixel electrode on the planarization layer, the pixel electrode electrically contacting the drain electrode via the drain contact hole.

18. A method of manufacturing a liquid crystal display device, the method comprising:

providing a substrate, the substrate including first and second regions;

forming a thin film transistor (TFT) on the first region of the substrate, the TFT having a gate electrode, an active layer, and source and drain electrodes;

forming a color filter on a second region of the substrate, the color filter, contacting both the source and drain electrodes, wherein said contacting is only at a portion where said color filter layer is overlapping only edge portions of the source and drain electrodes;

forming a planarization layer on the TFT and the color filter, the planarization layer including a drain contact hole to expose a portion of the drain electrode; and forming a pixel electrode on the planarization layer, the pixel electrode electrically contacting the drain electrode via the drain contact hole.

19. The method of claim 18, wherein forming the TFT includes:

forming a gate electrode;

forming a gate insulating layer, the gate insulating layer covering the gate electrode;

depositing a semiconductor layer on the gate insulating layer;

patterning the semiconductor layer to form an active layer;

forming an etch stopper layer on the active layer;

depositing a doped semiconductor layer, the doped semiconductor layer covering the semiconductor layer and the etch stopper layer;

forming source and drain electrodes on the doped semiconductor layer; and etching a portion of the doped semiconductor layer between the source and drain electrodes.

20. The method of claim 19, wherein the active layer is made of amorphous silicon.

21. The method of claim 18, further comprising:

forming a light shielding layer before forming the TFT; and forming an insulating layer covering the light shielding layer.

22. The method of claim 18, wherein forming the TFT includes:

forming a semiconductor layer;

forming a gate insulating layer, a width of the gate insulating layer being smaller than that of the semiconductor layer;

forming a gate electrode on the gate insulating layer;

ion-doping an exposed portion of the semiconductor layer to define source and drain regions;

forming an inter layer insulator entirely over the substrate, the inter layer including a source region contact hole to expose a portion of the source electrode therebelow, and a drain region contact hole to expose a portion of the drain electrode therebelow; and forming source and drain electrodes to be in electrical contact with the source and drain regions, respectively.

23. The method of claim 22, wherein the pure semiconductor layer is made of polysilicon.

* * * * *